United States Patent [19]

Kramer et al.

[11] Patent Number: 4,715,263
[45] Date of Patent: Dec. 29, 1987

[54] ROLL TURRET FOR A GUN MOUNT

[75] Inventors: S. Bertram Kramer, Santa Monica, Calif.; Evan P. Sampatacos, Mesa, Ariz.

[73] Assignee: McDonnell Douglas Helicopter Co., Mesa, Ariz.

[21] Appl. No.: 814,886

[22] Filed: Dec. 30, 1985

[51] Int. Cl.$^4$ .............................................. B64D 7/06
[52] U.S. Cl. .................................................. 89/37.21
[58] Field of Search ............................ 89/37.16, 37.21

[56] References Cited

U.S. PATENT DOCUMENTS

| | | | |
|---|---|---|---|
| 1,294,240 | 2/1919 | Cooke | 89/37.16 |
| 1,979,011 | 10/1934 | Potez | 89/37.16 |
| 2,137,577 | 11/1938 | Lobelle et al. | 89/37.16 |
| 2,214,722 | 9/1940 | De Seversky | 89/37.16 |
| 2,354,114 | 7/1944 | Growald | 89/37.16 |
| 2,406,102 | 8/1946 | Pontius, III | 89/37.16 |
| 2,511,183 | 6/1950 | Van Norman | 89/37.16 |
| 2,900,874 | 8/1959 | Tjossem | 89/37.16 |
| 3,086,425 | 4/1963 | Huey | 89/37.16 |
| 3,797,360 | 3/1974 | Marhefka et al. | 89/37.21 |

FOREIGN PATENT DOCUMENTS 99857  9/1940  Sweden ............................. 89/37.21

Primary Examiner—Stephen C. Bentley
Attorney, Agent, or Firm—Beehler, Pavitt, Siegemund, Jagger, Martella & Dawes

[57] ABSTRACT

A retractable gun for mounting within the fuselage of an aircraft, typically a helicopter, is disposed in a firing position and aimed by rotation of a turret which is coupled to and parallel to the longitudinal axis of the aircraft. The gun is aimed by simultaneous and independent rotation of the gun about an elevation pivot axis through which the gun is coupled to the turret. The turret axis and turret is disposed within an enclosure or within the fuselage of the airplane to allow withdrawal of the gun and turret from their exposed position. However, even in the enclosed position the gun can be fired. The elevation pivot axis is approximately perpendicular to the turret axis and permits two independent degrees of rotational freedom with which the gun may be aimed. Thus, the gun may be aimed at any point within at least a hemispherical range beneath the fuselage of an aircraft. Rotation of the gun about the same axes withdraws the gun into a position within the fuselage so that the fuselage and portions of the gun and turret form an enclosure about the gun and turret to minimize air drag. The retraction and aiming mechanism of the gun is compact, rugged, and reliable with the result that the gun mount is extremely battle-worthy.

5 Claims, 6 Drawing Figures

ROLL TURRET FOR A GUN MOUNT

BACKGROUND OF THE INVENTION

1. Field of the Invention

The present invention relates to the field of airborne armament, and in particular to gun mounts which are retractable from a fixed firing position to a remotely located and stowed position within a helicopter.

2. Description of the Prior Art

Gun mounts in an aircraft for the firing of nonguided ballistics can be categorized as substantially fixed and orientable only as the aircraft is oriented, or as freely orientable with respect to the aircraft. In the prior art gun mounts were fixed in the aircraft, typically in the wings, and have generally been nonorientable with respect to the aircraft, or orientable only to a very minor extent. Aiming such wing-mounted guns is largely effectuated by orienting the aircraft.

Independently orientable gun mounts for nonguided ballistics are also well known to the art and have been simultaneously developed at least as early as nonorientable gun mounts. An early example of a pivoted gun oriented below the fuselage of an aircraft and tiltable both for aiming and loading is shown in Cooke, "Airplane Gun," U.S. Pat. No. 1,294,240 (1919).

Very early on, however, the need for retraction of any type of gun mount into the body of the aircraft came about in order to minimize air drag or other interference to aerodynamic functions of the aircraft. Prior art examples include Potez, "Disappearing Carriage for Aircraft," U.S. Pat. No. 1,979,011 (1934), wherein a bucket, pivotally mounted below the fuselage of an aircraft, carried a swivel mounted machine gun and accommodations for a gunner.

An example where the gunner remains within the fuselage but the turret is telescoped from the fuselage to orient a gun is seen in Pontius III et al, "Trigger System for Gun Turrets," U.S. Pat. No. 2,406,102 (1946).

Another prior art illustration of a gun which incorporates a multiple axial pivot to rotate the gun to a firing position exterior to the fuselage and thereafter allow orientation of the gun for the purposes of aiming is shown in Growald, "Aircraft Gun Installation," U.S. Pat. No. 2,354,114 (1944).

A telescopic and field orientable rocket launching tube for use in helicopters is described by Marhefka et al, "Telescopic Airborne Launch Tube," U.S. Pat. No. 3,797,360 (1974). The telescopic tube is disposable exterior to the fuselage and helicopter, swivel orientable and retractable within the fuselage after firing. However, the mechanism for first disposing the gun exterior to the fuselage and then orienting the gun is complex and vulnerable to battle damage. Moreover, such a telescopic extension is unsuitable for a heavy rapid firing gun which extension must securely hold and aim the gun under substantial recoil forces.

Structurally stronger gun mounts are known in the art, for example used as tube rocket launchers, such as shown by Tjossem, "Rocket Launcher", U.S. Pat. No. 2,900,874 (1959), but no means is included within the rocket launcher for freely orienting or aiming the launcher, since the launcher is used with guided ballistics.

Therefore, what is needed is a method and mechanism whereby a gun which fires, nonguided ballistics can be enclosed within the fuselage of an aircraft and selectively extended exterior to the aircraft for free orientation for firing while simultaneously maintaining secure mechanical attachment of the gun in a battleworthy design.

BRIEF SUMMARY OF THE INVENTION

The invention is an apparatus for mounting a gun in an aircraft comprising a gun, and a turret rotationally coupled to and disposed within the aircraft. The turret defines a turret axis. The gun is rotationally coupled to the turret about an elevation pivot axis. The gun rotates with the turret about the turret axis. The gun is selectively rotatable about the elevational pivot axis. The elevational pivot axis is approximately orthogonal to the turret axis. The gun and turret can be arranged and configured about the elevation pivot axis and turret axis to assume a retracted orientation of the gun and turret within the aircraft. Other orientations of the gun and turret about the elevation pivot and turret axis other than the retracted orientation disposes the gun outside of the aircraft for firing. By reason of this combination of elements the positioning of the gun within and outside of the aircraft as well as aiming the gun in an arbitrary direction is effectuated by selective rotation of the gun and turret only about the turret axis and the elevation pivot axis.

The invention further comprises a mechanism for enclosing the gun and turret within the aircraft when in the retracted orientation. The mechanism for enclosing comprises at least a pair of doors. Each door coacts with the turret to selectively open and close to enclose the gun and turret. The mechanism for enclosing the gun and turret further comprises portions of the turret and gun. The aircraft has a longitudinal axis and the turret axis is approximately parallel to the longitudinal axis of the aircraft.

The turret comprises a pair of parallel arms extending in a plane generally perpendicular to the turret axis. The gun is rotationally coupled to the arms of the turret about the elevation pivot axis. The elevation pivot axis lies in the plane defined by the arms.

The invention also can be characterized as a method for manipulating a gun on an aircraft comprising the steps of positioning the gun within a fuselage of the aircraft in a folded configuration to minimize air drag on the fuselage, and selectively and independently rotating the gun about a turret axis and an elevation pivot axis. The turret axis is disposed in a plane parallel to the longitudinal axis of the aircraft, and the elevation pivot axis is defined by coupling of the gun to the turret rotatable about the turret axis. The gun is rotatable about the elevation pivot axis. By reason of this combination of steps the gun is disposed outside the aircraft and is selectively oriented in an arbitrary direction.

The step of positioning the gun within the fuselage of the aircraft comprises the steps of selectively enclosing the gun within a plurality of open doors, and selectively opening the doors by rotating the turret into contact with the doors to permit selective exposure of the gun outside the fuselage of the aircraft.

The step of selectively and independently rotating the gun about the turret axis and elevation pivot axis comprises the steps of rotating the gun about the turret axis wherein the turret axis is disposed within the fuselage of the aircraft.

The step of selectively and independently rotating the gun about the turret axis and the elevation pivot axis comprises the steps of rotating the gun about the turret axis. The turret axis is parallel to the longitudinal axis of the aircraft.

The step of positioning the gun within the aircraft comprises the step of orienting the gun and turret within the aircraft to orient selected surfaces of the gun and turret to form exterior portions of the fuselage of the aircraft.

Characterized yet another way, the invention is an apparatus for aiming a gun and for retracting the gun within the fuselage of an aircraft. The aircraft has a longitudinal axis. The apparatus comprises a mechanism for enclosing the gun within the fuselage, a turret mechanism for rotating the gun about a turret axis parallel to the longitudinal axis of the aircraft, and a pivot mechanism for coupling the gun to the turret mechanism. The turret mechanism is disposed within the fuselage of the aircraft. The turret mechanism further provides one degree of rotational freedom for aiming the gun. The turret mechanism is rotatable about the turret axis with the pivot mechanism. The pivot mechanism provides a second degree of rotational freedom of the gun for aiming the gun. By reason of this combination of elements, the gun is retracted and aimed by a rugged compact apparatus, and is disposed by the apparatus within the fuselage of the aircraft. The elevation pivot axis is approximately orthogonal to the turret axis.

The turret mechanism and gun form a retracted configuration when the turret mechanism and gun assume a predetermined orientation. The predetermined orientation of the gun permits firing of the gun. The retracted configuration of the turret mechanism and gun is indistinguishable with respect to the operational relationship of the gun and turret about the turret axis and elevational pivot axis from firing positions of the gun. The retracted configuration is characterized by substantial enclosure of the gun and turret mechanism.

Turn now to the invention as depicted in the illustrated embodiment in the following Figures wherein like elements are referenced by like numerals.

The invention and its various embodiments may now be better understood by turning to the following detailed description.

DETAILED DESCRIPTION OF THE PREFERRED EMBODIMENTS

A retractable gun for mounting within the fuselage of an aircraft, typically a helicopter, is disposed in a firing position and aimed by rotation of a turret which is coupled to and parallel to the longitudinal axis of the aircraft. The gun is aimed by simultaneous and independent rotation of the gun about an elevation pivot axis through which the gun is coupled to the turret. The turret axis and turret is disposed within an enclosure or within the fuselage of the airplane to allow withdrawal of the gun and turret from their exposed position. However, even in the enclosed position the gun can be fired. The elevation pivot axis is approximately perpendicular to the turret axis and permits two independent degrees of rotational freedom with which the gun may be aimed. Thus, the gun may be aimed at any point within at least a hemispherical range beneath the fuselage of an aircraft. Rotation of the gun about the same axes withdraws the gun into a position within the fuselage so that the fuselage and portions of the gun and turret form an enclosure about the gun and turret to minimize air drag. The retraction and aiming mechanism of the gun is compact, rugged, and reliable with the result that the gun mount is extremely battle-worthy.

The turret is rotatably mounted within the fuselage of an aircraft or more particularly, in a helicopter. Normally, the turret and gun are entirely enclosed within the aircraft and, therefore, are not exposed or create drag. Ammunition is loaded into the gun through the turret through a fanning mechanism designed according to conventional principles. When the gun is activated, it rotates about the roll axis of the turret, which is parallel to the longitudinal axis or fore-and-aft axis of the aircraft. The gun can be positioned and pointed in any direction by virtue of control about two axes of rotation, namely the roll axis of the turret and the pivot axis of the gun. Therefore, the disposition of the gun into a firing position and retraction into an enclosed position, as well as aiming, is accomplished by means of axes, at least some of which are used in common for both functions.

Figure 1:
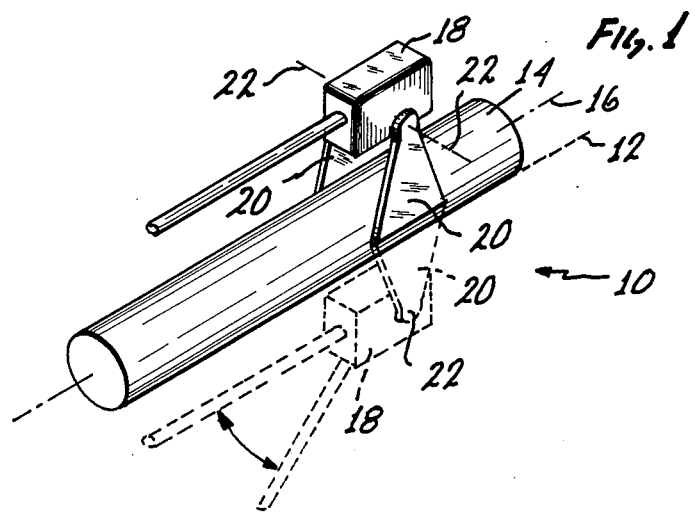
FIG. 1 is a highly diagrammatic drawing of a gun mount incorporating the invention.

The invention can be better understood by specifically turning to the highly diagrammatic depiction of FIG. 1. The gun turret assembly, generally denoted by reference 10, is shown in solid outline while fuselage 12 is symbolically depicted in dotted outline. Similarly, the lowered or exposed position of the gun is also depicted in dotted outline. However, return your attention to the solid line depiction of FIG. 1. Gun 10 is characterized by a turret 14 fully disposed in the fuselage 12. Turret 14 is characterized by a roll or turret axis 16 about which turret 14 rotates. A rapid fire gun or cannon 18, well known to the art, is mounted in or attached to turret 14. In the highly conceptual depiction of FIG. 1, gun 18 is mounted to turret 14 by means of a pair of arms 20 which extend in a direction generally perpendicular to and offset from roll or turret axis 16 of turret 14. Gun 18 is coupled, in turn, to arms 20 by conventional means such as an elevation pivot axis 22. Therefore, gun 18 may rotate simultaneously and independently about elevation pivot axis 22 and roll or turret axis 16. If it is desired to fire the gun, turret 14 is rotated to expose gun 18 in a position shown in dotted outline in FIG. 1. With combined rotation of axes 16 and 22, gun 18 may be pointed in any direction. In other words, in order to be freely orientable, gun 18 requires two degrees of rotational freedom, namely 360 degrees orientation about an azimuthal axis and approximately 90 degrees rotation about the zenith axes.

Rotation of gun 18 about roll or turret axis 16 and elevational pivot axis 22 is accomplished by any means well known to the art, such as through electrical, hydraulic, mechanical means or a combination of such means. In the illustrated embodiment gun 18 is motively positioned by conventional electrical motors and mechanical drive gears and linkages subject to an electronic fire control system. The fire control system plays no particularly material role vis-a-vis the invention and will thus not be described.

Although, it may not be readily apparent on first examination, the gun of FIG. 1 enjoys two degrees of rotational freedom, one about turret axis 16 and the second one about elevational axis 22 which are equivalent to azimuthal rotation about a vertical z-axis and elevational rotation about an x- or y-axis perpendicular with the vertical z-axis of a conventional three dimensional cartesian coordinate system. Stated in another way, an arbitrary direction in space can be characterized by two angles, namely an azimuthal angle made by the direction with respect to a horizontal x-axis and a polar angle made by the direction with respect to a vertical z-axis. This would be the normal mathematical convention for using polar coordinates to denote a direction. However, a projection of any direction can be taken into a plane, for example, into the x-z plane, so that the aximuthal angular displacement is defined about the y axis (in the x-z plane in a right-handed coordinate system) from the x axis, and the polar angular displacement is similarly measured from the y axis indicating the rotation about an axis perpendicular to the y axis and in the x-z plane. Generally, independent degrees of rotation about two orthogonal axes, one of which rotates with the other, permits totally arbitrary directional placement of a vector carried by such rotations.

Therefore, the barrel of gun 18 can be arbitrarily aimed in any direction by virtue of selective angular displacement of turret axis 16 and elevational pivot axis 22. However, at the same time, turret axis 16 is the axis used to dispose and retract gun 18 into and from its exposed firing position.

Figure 2:
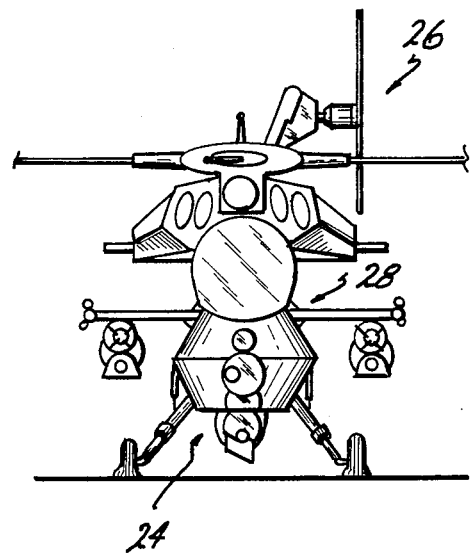
FIG. 2 is a front elevational view of a helicopter showing a gun mounted in accordance to the invention in the exposed central position.
Figure 3:
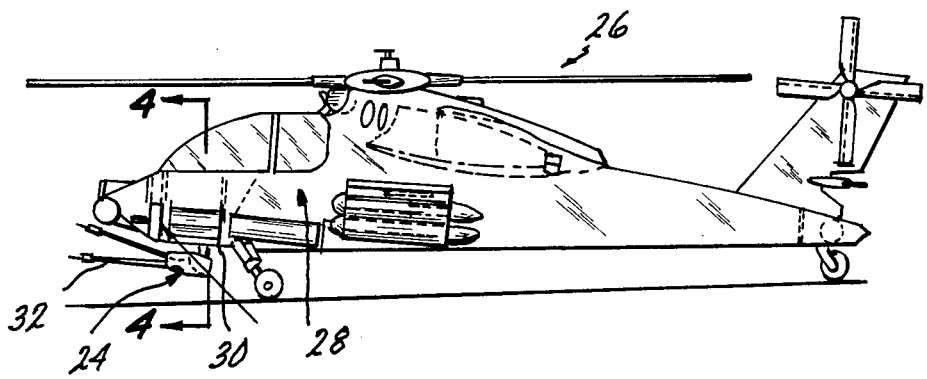
FIG. 3 is a side elevational view of a helicopter shown in FIG. 2.

Turn now to FIG. 2 wherein a gun, generally denoted by reference 24, is shown in frontal elevational view in a helicopter, generally denoted by reference 26. Helicopter 26 is characterized by a fuselage 28 into which gun 24 is retracted. In FIGS. 2 and 3 gun 24 is shown in an exposed position disposed beneath the under belly 30 of fuselage 28. FIG. 3 shows gun 24 with barrel 32 of gun 24 shown in solid outline in a first orientation and in a dotted outline in a second orientation. Gun 24 is shown in the illustrated embodiment as mounted beneath fuselage 28 and the nose portion of aircraft 26. It should be understood that other positions within aircraft 265 could similarly be fitted with a gun mounted according to the invention.

Figure 4:
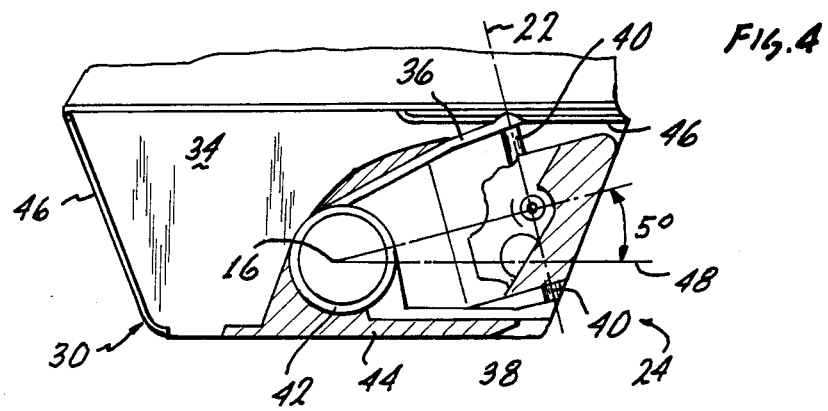
FIG. 4 is a cross-sectional view of a gun mount taken through line 4—4 of FIG. 3 shown in enlarged scale.
Figure 5:
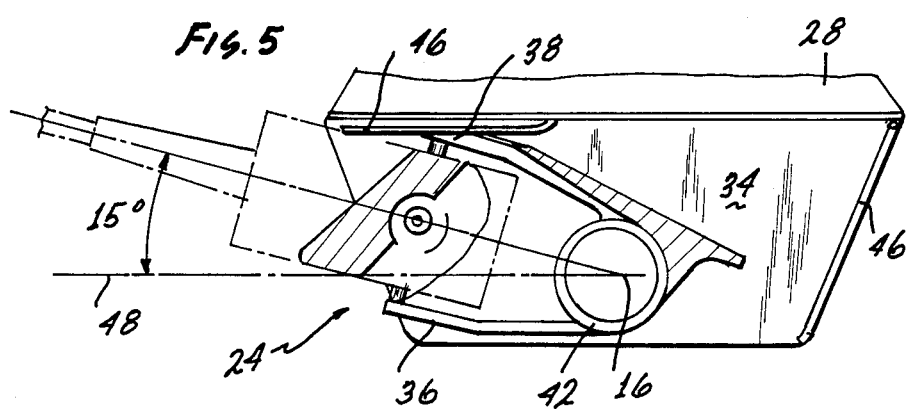
FIG. 5 is a cross-sectional view of FIG. 4 showing the gun exposed in extended to a maximum extent to the right.
Figure 6:
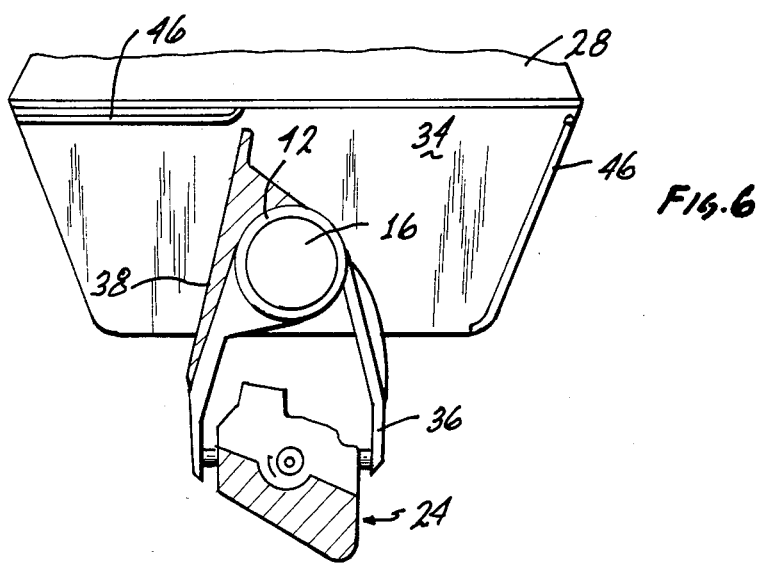
FIG. 6 is a cross-sectional view shown in FIGS. 4 and 5 with the gun shown in the exposed central position.

Turn now to the illustration of FIGS. 4-6 where the details of the mounting can better be appreciated as seen in cross-sectional view taken through lines 4—4 of FIG. 3. Gun 24 is shown in FIG. 4 in the concealed or stowed position a gun well 34. As illustrated in FIG. 1, gun 24 is rotatable about a turret axis 16 which is parallel to the nose-tail or longitudinal axis of aircraft 26. Gun 24 is also rotatable about an elevational axis 22 which lies in a plane perpendicular to turret axis 16. Elevational axis 22 is defined by a pivot assembly 40 which includes a rotatable coupling to the body of gun 24 on one end and to a pair of parallel extending arms 36 and 38 at the other. Arms 36 and 38 couple pivot assembly 40 defining elevation axis 22 with a turret 42 defining turret axis 16.

Arm 38 is modified so that its exterior surface 44 also serves to define the outside of fuselage 28, and more particularly, that portion of under belly 30 forming the enclosing shell of gun well 34. Gun well 34 similarly provided with two rotatable side doors 46, the left one of which is shown in the down position in FIG. 4, and the right one of which is shown in the up position in FIG. 4. These doors are spring loaded and urged to retain a downward position, but are rotated upwardly to an open position by contact with arms 36 or 38, as appropriate, when gun 24 is rotated about turret axis 16 either to the left or right. For example, as shown in FIG. 4, gun 24 is fully rotated to the port side of the aircraft (to the right side of the Figure since the reader is viewing gun well 34 from a noseon position). Also in the port side position, gun 24 may be fired in any direction including any direction from at least dead ahead to directly astern. Similarly, gun 24 may rotate from dead ahead and to fully astern through a sweep on the starboard side of the aircraft.

As shown in FIG. 4, the angle of arms 36 and 38 with respect to the horizontal, denoted by plane 48, further allow gun 24 to be pointed upward to a degree above horizontal plane 48. In the illustrated embodiment, angle 50 is approximately 15 degrees so that gun 24 cannot only be pointed to any direction in the hemisphere below aircraft 26 and below horizontal plane 48, but also includes a 15 degrees solid angle above the lower hemisphere.

Extending your attention to FIGS. 5 and 6, it can now readily be appreciated that gun 24 can be rotated about turret axis 16 to be extended to the starboard side of the aircraft as shown in FIG. 5, or left in a central position such as shown in FIG. 6.

When extended to the starboard most direction, gun 24 again can be extended above horizontal plane 48 by approximately 15 degrees. In the configuration of FIG. 5 arm 38 contacts the starboard door panel 46 thereby urging door panel 46 to a fully open configuration. In the meantime, arm 36 has been rotated away from port door panel 46 which now resumes a fully downward or closed position.

In the central position as shown in FIG. 6, both door panels 46 will be allowed to remain in the downward or closed position. Thus, door panel 46, which may be armored, provides additional protection to the turret mechanism of gun 24.

When gun 24 is in a retracted position, which is shown in FIG. 4, the stowed gun together with its supports from the external profile of fuselage 28. When fully retracted gun 24 may, however, still be fired. Even when gun 24 is in the extended firing position, gun well 34 is maintained in the extended firing position, gun well 34 is maintained in as closed a configuration as possible in order to maintain the streamline of the external fuselage profile and to minimize air drag, particularly at high forward speeds.

Many modifications and alterations may be made by those having ordinary skill in the art without departing from the spirit and scope of the invention. Thus illustrated embodiment has been set forth only for the purposes of example and should not be read as limiting the invention which is defined in the following claims.

I claim:

1. An apparatus for mounting a gun in an aircraft comprising:
   a gun;
   a turret rotationally coupled to and disposed within said aircraft, said turret defining a turret axis, said gun being rotationally coupled to said turret about an elevation pivot axis, said gun rotating with said turret about said turret axis and said gun being selectively rotatable about said elevational pivot axis, said elevational pivot axis being approximately orthogonal to said turret axis, said gun and turret being arranged and configured about said elevation pivot axis and turret axis to assume a retracted orientation of said gun and turret within said aircraft, an orientation of said gun and turret about said elevation pivot and turret axis other than said retracted orientation disposing said gun outside of said aircraft for firing; and means for enclosing said gun and turret within said aircraft when in said retracted orientation, wherein said means for enclosing comprises at least a pair of doors, each door coacting with said turret by contact between said turret and each door to selectively expose said gun and turret outside said aircraft and to selectively enclose said gun and turret within said aircraft, whereby positioning of said gun within and outside of said aircraft as well as aiming with said gun in an arbitrary direction is effectuated by selective rotation of said gun and turret only about said turret axis and said elevation pivot axis.

2. The apparatus of claim 1 wherein said turret axis is provided for aiming said gun, wherein said aircraft has a longitudinal axis and wherein said turret axis is approximately parallel to said longitudinal axis, and where said turret comprises a pair of parallel arms extending in a plane generally perpendicular to said turret axes, said gun being rotationally coupled to said arms of said turret about said elevation pivot axis, said elevation pivot axis lying in said plane defined by said arms.

3. A method for manipulating a gun on an aircraft comprising the steps of:

positioning said gun within a fuselage of said aircraft in a folded configuration to minimize air drag on said fuselage; and selectively and independently rotating said gun about a turret axis and an elevation pivot axis, said turret axis being disposed in a plane parallel to the longitudinal axis of said aircraft and said elevation pivot axis being defined by coupling of said gun to said turret rotatable about said turret axis, said gun being rotatable about said elevation pivot axis, where in the step of positioning said gun within said fuselage of said aircraft comprises the steps of selectively and at least partially enclosing said gun within a plurality of openable doors, and selectively opening said doors by rotating said turret into contact with said doors to permit selective exposure of said gun outside fuselage of the aircraft, whereby said gun is disposed outside the aircraft and is selectively oriented in an arbitrary direction, 4. The method of claim 3 where said step of selectively and independently rotating said gun about said turret axis and said elevation pivot axis comprises the steps of rotating said gun about said turret axis, said turret axis being parallel to said longitudinal axis of said aircraft to expose said gun outside said aircraft and rotating said gun about said pivot axis when said pivot axis is disposed exterior to said aircraft.

5. An apparatus for retracting a gun within the fuselage of an aircraft, said aircraft having a longitudianl axis, and for aiming said gun, said apparatus comprising:

means for enclosing said gun within said fuselage;

turret means for aiming said gun by rotating said gun about a turret axis parallel to said longitudinal axis of said aircraft, said turret means disposed within said fuselage of said aircraft, said turret means further for providing one degree of rotational freedom for aiming said gun; and pivot means for coupling said gun to said turret means, said turret means rotatable about said turret axis by said pivot means, said pivot means for providing a second degree of rotational freedom of said gun for aiming said gun, wherein said means for enclosing said gun and turret means comprises a plurality of selectively operable doors, said doors coacting by contact between said doors and said turret means to open and close according to orientation of said turret means, whereby said gun is retracted and aimed by a rugged compact apparatus and disposed by said apparatus within said fuselage of said aircraft.

* * * * *